United States Patent [19]

Nakayama et al.

[11] 4,302,070
[45] Nov. 24, 1981

[54] OPTOELECTRONIC SEMICONDUCTOR DEVICE HAVING AN OPTICAL FIBER CONNECTOR

[75] Inventors: Takayuki Nakayama, Kawasaki; Nobuhiro Inagaki, Yokohama; Michio Ishihara, Yokohama; Ryosuke Namazu, Yokohama, all of Japan

[73] Assignee: Fujitsu Limited, Kawasaki, Japan

[21] Appl. No.: 63,777

[22] Filed: Aug. 6, 1979

[30] Foreign Application Priority Data

Aug. 4, 1978 [JP] Japan .................................. 53-94517

[51] Int. Cl.³ ........................... G02B 5/14; G02B 5/16; H01L 27/14
[52] U.S. Cl. ................................ 350/96.19; 350/96.21; 350/96.22; 357/17; 357/74; 357/30
[58] Field of Search .......................... 357/17, 74, 30; 350/96.19, 96.2, 96.21, 96.22

[56] References Cited

U.S. PATENT DOCUMENTS

| | | | |
|---|---|---|---|
| 3,932,761 | 1/1976 | Ramsey et al. | 350/96.21 |
| 3,948,582 | 4/1976 | Martin | 350/96.21 |
| 4,027,938 | 6/1977 | Lewis | 350/96.22 |
| 4,076,376 | 2/1978 | Slaughter | 350/96.2 |
| 4,140,367 | 2/1979 | Makuch et al. | 350/96.22 |
| 4,186,996 | 2/1980 | Bowen et al. | 357/17 |
| 4,199,222 | 4/1980 | Ikushima et al. | 350/96.19 |

Primary Examiner—Andrew J. James
Attorney, Agent, or Firm—Staas & Halsey

[57] ABSTRACT

An optoelectronic semiconductor device for use in an optical transmission system comprises a stem for mounting an optoelectronic semiconductor element thereon and a cap within which an optical fiber, optically communicating with the optoelectronic semiconductor element, is arranged. An end of the optical fiber within the cap is exposed on the cap surface. A screw is formed on the outer suface of the cap and a nut, which engages the screw, is provided for optically connecting optical transmission fiber with the optical fiber within the cap.

15 Claims, 4 Drawing Figures

OPTOELECTRONIC SEMICONDUCTOR DEVICE HAVING AN OPTICAL FIBER CONNECTOR

BACKGROUND OF THE INVENTION

The present invention relates to an optoelectronic semiconductor device used in an optical transmission system.

A prior art connector mechanism of an optoelectronic semiconductor device and an optical transmission fiber in an optical transmission system is illustrated in FIG. 1. An optoelectronic semiconductor device 3 is secured to a support member 2 on a stage 1. The optoelectronic semiconductor device 3 comprises a stem 5, a lead terminal 6, and a cap 4. For example, a light emitting element (not shown) is mounted on the stem 5. An optical fiber for transmitting the light from the light emitting element is inserted within a protective sleeve 8. The protective sleeve 8 is secured to the cap 4 by, for example, a synthetic resin. A connector 7 connects the optical fiber within the protective sleeve 8 and an optical transmission fiber 9. The connector 7 comprises a body 27 and an inside member 10. The inside member 10 and the optical fiber 9 are interconnected by a synthetic resin 11. The protective sleeve 8 is eccentrically rotated by a known double eccentric wheel-type positioning device so as to align the protective sleeve 8 with the optical fiber 9. At a position where the optical axes of both optical fibers are aligned with each other, the protective sleeve 8 is fixed to the body 27. However, in the above mentioned prior art connector mechanism, the work required in the positioning process for aligning the optical axes with each other consumes substantial time and is difficult.

SUMMARY OF THE INVENTION

It is an object of the present invention to obviate the above mentioned drawbacks so as to provide an optoelectronic semiconductor device of small and simple construction in which said optoelectronic semiconductor device and an optical transmission fiber are easily interconnected without much loss of transmissive light at the connecting point.

In an optoelectronic semiconductor device according to the present invention for connection to an optical transmission fiber, said optoelectronic semiconductor device comprises a stem for mounting a optoelectronic semiconductor element (or chip) thereon and a cap within which an optical fiber, optically communicating with said optoelectronic semiconductor element, is arranged so that an end of said optical fiber is exposed on the cap surface. As a connector mechanism, a screw is formed on the outer surface of said cap and the optical transmission fiber is optically connected with said optical fiber within said cap by means of a nut which engages said screw.

DETAILED DESCRIPTION OF PREFERRED EMBODIMENTS OF THE INVENTION

Figure 1:
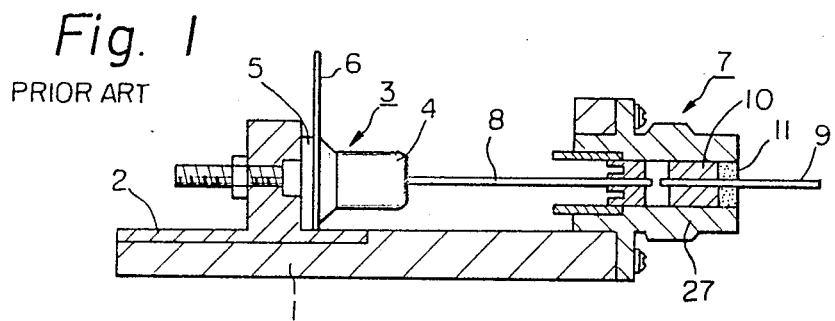
FIG. 1 is a sectional view of a connector mechanism of an optoelectronic semiconductor device according to the prior art.
Figure 2:
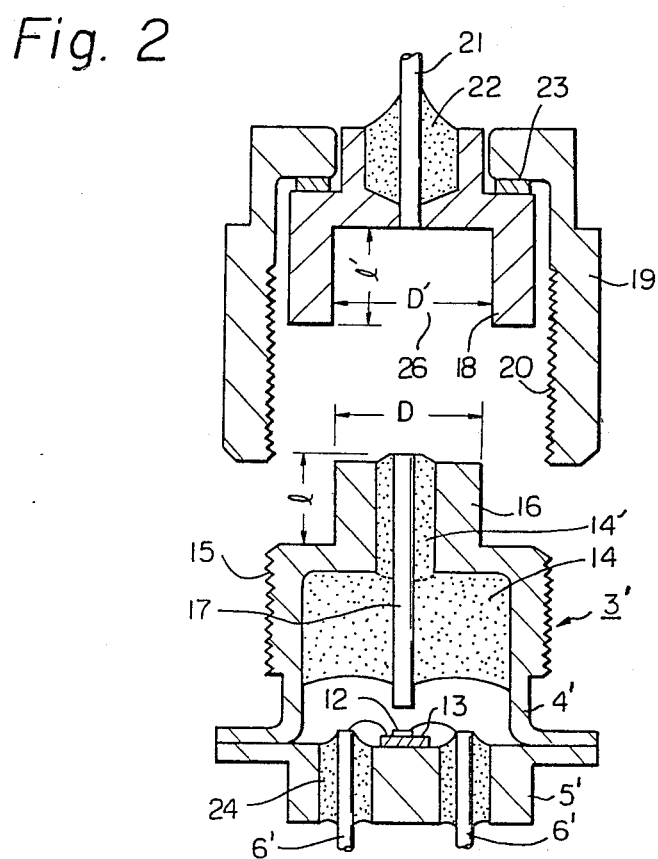
FIG. 2 is a sectional view of a connector mechanism of an optoelectronic semiconductor device and an optical transmission fiber, according to the present invention.

In FIG. 2, an optoelectronic semiconductor device 3' is illustrated according to the invention. A support plate 13 of beryllia (beryllium oxide: BeO) is mounted on a metal stem 5', preferably made of iron. An optoelectronic semiconductor element 12, which is, for example, a light emitting diode (LED), a laser diode, a photo diode, an avalanche photo diode or a pin diode, is mounted on the support plate 13. Each of the electrodes of the optoelectronic semiconductor element 12 is connected to a lead terminal 6' either through a lead wire and a metallized layer (not shown) on which the optoelectronic semiconductor element 12 is fixed or only through a lead wire. Two lead terminals 6' of iron-nickel alloy extend through the stem 5' and project beneath the stem 5'. Each lead terminal 6' is sealingly secured to the stem 5' by a sealing glass 24. A metallic cap 4', preferably of nickel silver, is welded to the stem 5' such as by a resistance welding method. Within the cap 4', an optical fiber 17 is arranged along the center axis of the cap 4'. The optical fiber 17 is secured to the cap 4' by a glass material or a synthetic resin 14 and 14'. A cylindrical projection 16 is formed on the top of the cap 4'. The end surface of the optical fiber 17 is exposed to the top surface of the projection 16 with the optical axis of the optical fiber 17 being positioned at the center of the circular-shaped top surface of the projection 16.

As part of the connecting mechanism, an inside member 18 of, for example, stainless steel, is provided having a recess 26 into which the projection 16 fits. An optical transmission fiber 21 is secured to the inside member 18 by a glass material or a synthetic resin 22. The inside diameter D' and the depth l' of the recess 26 are equal to the outside diameter D and the height l of the projection 16, respectively. The optical axis of the optical transmission fiber 21 is positioned at the center of the recess 26. In practice, the depth l' is, preferably, slightly larger than the height l of the projection 16 so that a gap of several microns width is formed between the end surfaces of the optical fibers 17 and 21, so as to prevent the opposing ends of the fibers from being damaged by abutting against each other. A screw 15 is formed on the peripheral side surface of the cap 4'. A threaded portion 20 for engagement with the screw 15 is formed on an inside surface of a hollow nut member 19. Preferably member 19 is formed of stainless steel. The inside member 18 is fixed to the projection 16 of the cap 4' through a washer 23 by screwing member 15 into engagement with the threaded portion 20 of the hollow nut member 19. By securing the inside member 18 to the projection 16, the optical axes of the optical fibers 17 and 21 are aligned with each other, because the optic axis of the optical fiber 17 in the cap 4' is positioned at the center of the projection 16 and the optical axis of the optical transmission fiber 21 is positioned at the center of the recess 26 of the inside member 18.

Figure 3A:
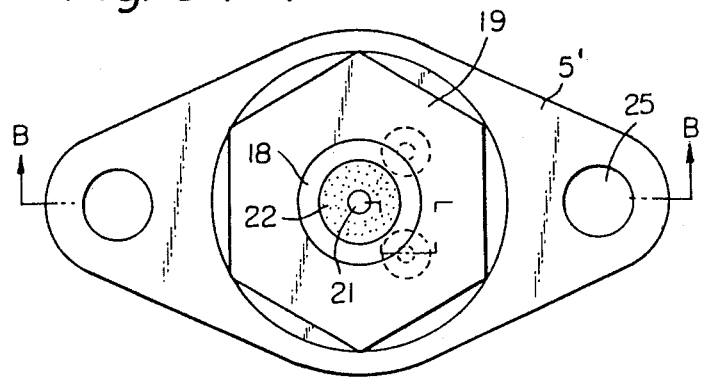
FIG. 3(A) is a top view of another connector mechanism of an optoelectronic semiconductor device and an optical transmission fiber according to the present invention.
Figure 3B:
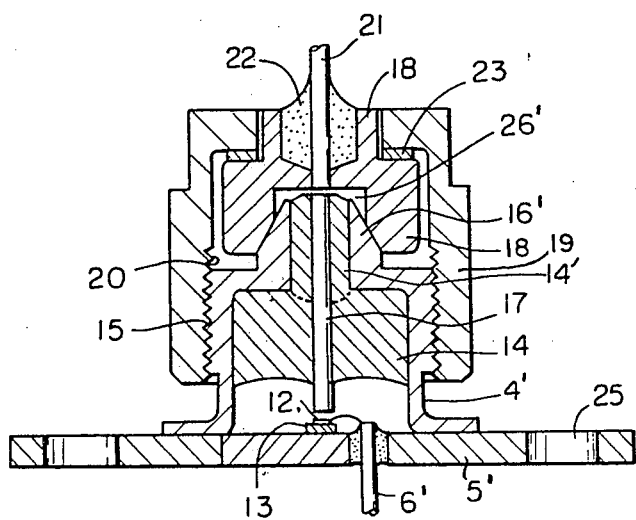
FIG. 3 (B) is a sectional view along the line B—B in FIG. 3(A).

Another embodiment of the present invention is illustrated in FIGS. 3(A) and 3(B). In this embodiment, the cap 4' has a truncated cone shaped projection 16' and the inside member 18 has a recess 26' in a mating shape corresponding to the truncated cone shape of projection 16'. A stem 5' has holes 25 for securing the optoelectronic semiconductor device to a base plate. The construction of the other portions and the function of this embodiment are substantially the same as those of the aforementioned embodiment.

In both of the above embodiments, the glass material or synthetic resin 14 may be supplied only within the inside portion 14' of the projection 16, which portion is defined by a broken line in FIG. 2 and FIG. 3(B), instead of filling the entire inside portion of the cap 4' for securing the optical fiber 17 to the cap 4'. In such an arrangement, the optical fiber 17 can continue to be reliably secured to the cap 4' in an accurate position with a smaller amount of the glass material or synthetic resin.

Instead of being connected to the aforementioned nut 19 which is installed on the end of the optical transmission fiber 21, the optoelectronic semiconductor device according to the present invention can be connected to a suitable support member which comprises nut means into which said screw 15 of the cap 4' of the optoelectronic semiconductor device can be screwed. The optoelectronic semiconductor device can be mounted on, for example, a circuit board having a hole inside of which a threaded portion is formed corresponding to said screw 15 of the cap 4'. The device would thus be mounted by screwing the cap 4' into the hole.

In another arrangement of the present invention, the optoelectronic semiconductor device can be secured to a circuit board having a through hole which penetrates the board. In this arrangement, the cap of the optoelectronic semiconductor device is inserted into the through hole from one side of the board, and nut means is screwed onto the cap from the other side of the board. In addition to this nut means, the nut 19 which is installed on the end of the optical transmission fiber, as illustrated in FIGS. 2 and 3, can be screwed onto the cap so as to optically connect the optoelectronic semiconductor device and said optical transmission fiber.

As mentioned above, in the optoelectronic semiconductor device according to the present invention, a projection is formed on the top of the cap of said optoelectronic semiconductor device and fitted into a recess of an inside member which is arranged at the end of an optical transmission fiber. The, optical fibers are positioned at the centers of the cap and the inside member recess, respectively. Therefore, the positioning process for aligning the optical fibers with each other can be deleted when connecting the optoelectronic semiconductor device and the optical transmission fiber together, without an optical communication difficulty due to loss of transmissive light at the connecting point. The inside member is urged against the cap by screwing the hollow nut member onto the screw formed on the outside surface of the cap. Such a construction is simple and the connecting work is achieved easily. Since the connecting mechanism comprises screw means, the optoelectronic semiconductor device and the connector mechanism are not permanently connected, as was the case in the prior art. Therefore, when necessary, only a desired part can be exchanged or replaced without having to exchange or replace the entire optoelectronic semiconductor device.

The present invention is not limited to the above mentioned embodiments but can be modified into variations thereof within the scope of the claims.

What is claimed is:

1. An optoelectronic semiconductor device for optical connection with an optical transmission fiber comprising:
   (a) an optoelectronic semiconductor element;
   (b) a stem for mounting the optoelectronic semiconductor thereon;
   (c) an optical fiber optically communicating with the optoelectronic semiconductor element;
   (d) a cap secured to the stem for containing the optical fiber therein;
   (e) a projection formed on the top portion of the cap and wherein the face of a first end of the optical fiber is exposed on the top surface of the projection and the face of a second end of the optical fiber is positioned adjacent the optoelectronic semiconductor element;
   (f) a screw formed on the external side surfaces of the cap; and
   (g) nut means engageable with the screw for optically connecting the optical transmission fiber to the optical fiber, wherein said nut means comprises (i) a hollow nut member having an inner threaded portion for engagement with the screw and (ii) an inside member provided inside the hollow nut member, secured to an end of the optical transmission fiber, and having a recess formed in the inside member in a shape compatible with the shape of the projection for mating with and insertion of the projection therein.

2. An optoelectronic semiconductor device according to claim 1, in which said projection and recess have compatible cylindrical shapes.

3. An optoelectronic semiconductor device according to claim 1, in which said projection and recess have compatible truncated cone shapes.

4. An optoelectronic semiconductor device according to claim 1, wherein the screw secures the semiconductor device to a support member of an optical transmission system.

5. An optoelectronic semiconductor device according to claim 1, in which said optoelectronic semiconductor element comprises one of the following: a light emitting diode, a laser diode, a photo diode, an avalanche photo diode, or a pin diode.

6. The optoelectronic semiconductor device of claim 1, wherein the first end of the optical fiber is positioned at the center of the top surface of the projection.

7. The optoelectronic semiconductor device of claim 1 or 6, wherein the end of the optical transmission fiber secured to the inside member is positioned at the center of the bottom surface of the recess.

8. The optoelectronic semiconductor device of claim 1, wherein the device is secured to a circuit board of an optoelectronic transmission system, said circuit board having a through hole and wherein the cap of the semiconductor device is insertable into the through hole of the circuit board from one side and wherein the semiconductor device further comprises nut means attachable to the cap on the other side of the circuit board for securing the cap to the board.

9. The optoelectronic semiconductor device of claim 4 wherein the support member comprises a circuit board having a threaded hole compatible with the screw of the device and wherein the screw is threadably engaged with the threaded hole for securing the device to the circuit board.

10. The optoelectronic semiconductor device of claim 1, further comprising a washer positioned between the inside member and hollow nut member, and wherein the projection of the cap is positioned into the recess of the inside member for optically aligning the optical fiber with the optical transmission fiber when the screw is threadably engaged with the threaded portion of the hollow nut member.

11. The optoelectronic semiconductor device of claim 1 or 6, further comprising a glass or synthetic resin material for securing the optical transmission fiber to the inside member and the optical fiber within the cap and projection.

12. The optoelectronic semiconductor device of claim 1, 2, 3 or 10, wherein the depth of the recess and height of the projection are approximately equal.

13. The optoelectronic semiconductor device of claim 12, wherein the recess depth is slightly greater than the projection height for forming a gap therebetween to prevent damage to the opposing ends of the optical fiber and the optical transmission fiber.

14. The optoelectronic semiconductor device of claim 13, wherein the gap is of several microns.

15. The optoelectronic semiconductor device of claim 2, wherein the diameters of the projection and recess are approximately equal.

* * * * *

UNITED STATES PATENT AND TRADEMARK OFFICE
CERTIFICATE OF CORRECTION

PATENT NO. : 4,302,070

DATED : November 24, 1981

INVENTOR(S) : Takayuki Nakayama, Nobuhiro Inagaki, Michio Ishihara, Ryosuke Namazu It is certified that error appears in the above—identified patent and that said Letters Patent is hereby corrected as shown below:

Front page, [57] ABSTRACT, line 10, after "connecting" insert --an--;
Column 1, line 48, after "mounting" change "a" to --an--.

Signed and Sealed this

Twenty-fifth Day of May 1982

[SEAL]

Attest:

Attesting Officer

GERALD J. MOSSINGHOFF

Commissioner of Patents and Trademarks